United States Patent
Haupt

[11] Patent Number: 6,019,952
[45] Date of Patent: Feb. 1, 2000

[54] PROCESS FOR OXIDATIVE EXHAUST GAS CLEANING

[75] Inventor: Jens Haupt, Cospeda, Germany

[73] Assignee: L.U.T. Labor- und Umwelttechnik Jena GmbH, Jena, Germany

[21] Appl. No.: 08/989,111

[22] Filed: Dec. 11, 1997

[51] Int. Cl.$^7$ .................................................. B01D 53/72
[52] U.S. Cl. ........................................ 423/210; 423/245.3
[58] Field of Search .................................. 423/210, 245.3

[56] References Cited

U.S. PATENT DOCUMENTS 5,571,491  11/1996  Thunstrom ........................... 423/245.3

FOREIGN PATENT DOCUMENTS

| 41 42 176 A1 | 6/1993 | Germany . | |
|---|---|---|---|
| 889 085 | 12/1981 | U.S.S.R. .............................. | 423/245.3 |
| 2 051 761 | 1/1981 | United Kingdom ................ | 423/245.3 |

*Primary Examiner*—Gary P. Straub
*Assistant Examiner*—Timothy C Vanoy
*Attorney, Agent, or Firm*—McAulay Nissen Goldberg Kiel & Hand, LLP

[57] ABSTRACT

A process is provided for destroying organic contaminants, such as oil mists from workshop rooms, formaldehyde and aromatics, out of exhaust gases by passing the exhaust gas through two reactors connected in a parallel arrangement to a contaminated exhaust gas inlet. Each of the two reactors is equipped with a plurality of serially arranged reaction zones, wherein each reaction zone contains an upstream catalyst (such as a commercial wire knit catalyst); a downstream absorbent (such as Y zeolite or H-ZSM) and a heater. A major portion of the contaminated exhaust gas is passed through one of the two reactors, while, simultaneously, a minor portion of the contaminated exhaust gas is passed through the other reactor. After a period of time, the exhaust gas flow rate through the two reactors is reversed so that a major portion of the exhaust gas now flows through the reactor that previously had a minor portion of the exhaust gas flowing through it and a minor portion of the exhaust gas now flows through the reactor that previously had a major portion of the exhaust gas flowing through it, so that the process is cyclical in this manner. When a major portion of the exhaust gas flows through a reactor, the hydrocarbon contaminants are sorbed into the absorbent. When a minor portion of the exhaust gas flows through a reactor, the reactor is heated to the catalyst light-off temperature so that the contaminants within the exhaust gas and the contaminants released from the absorbent are catalytically destroyed in a downstream catalyst in an adjacent downstream reaction zone.

5 Claims, 2 Drawing Sheets

PROCESS FOR OXIDATIVE EXHAUST GAS CLEANING

BACKGROUND OF THE INVENTION a) Field of the Invention

The invention is directed to an arrangement and to the associated process for cleaning exhaust gases with oxidizable pollutants in which even small concentrations of pollutants can be safely reduced through the combination of adsorption and catalysis with low expenditure of energy. The invention is further directed to the development of the process as a regenerative principle.

b) Description of the Related Art

A large number of modern processes for the treatment and processing of polymer materials and the melting losses or burnup of oils and other process materials in metalworking generate polluted exhaust air that is usually removed from the workplace by means of plant exhaust installations or localized exhaust systems in order to maintain work hygiene standards. Similar exhaust installations are used in kitchen facilities to remove steam or vapor especially when foodstuff is being prepared by frying in oils and fats.

All known processes have in common that a considerable amount of heat is extracted from the room air by the exhaust means. For this reason, exhaust installations of this type often contain costly air-to-air heat exchangers or else the heat is supplied subsequently by additional heating of the air supply. In the prior art, filter units and separating units which are combined in various ways in accordance with materials processing techniques ensure that necessary emission standards with respect to the introduction of exhaust gases into the atmosphere are maintained. For the most part, the residues of the filter units and separating units must be disposed of as special waste in a costly manner.

In the case of exhaust gases containing toxic pollutants, it is generally not possible to reintroduce the filtered exhaust air back into the workplace, since there are hardly any economically feasible solutions for safely removing pollutants with an adequate cleaning effect.

Cleaning requirements are especially difficult when the separated residue has multiple phases and its solid phase has a sticky, pasty consistency. For these reasons, wet scrubbers are frequently used for laser material processing plants (see DE 3 203 908 A1 and DE 4 422 042 A1).

The starting point for the solution to this problem consists in the use of catalytic exhaust gas treatment reactors. The vast majority of known technical solutions for exhaust gas catalysis have been for the treatment of exhaust gases of Otto engines and diesel engines. Besides the known precious-metal-containing catalysts on ceramic carriers, catalysts are shown, e.g., in DE 3 940 758 C2, whose active components include vanadium and platinum metals which are applied to finely particulate oxides or zeolites. A further development of this principle is shown in DE 4 213 018, wherein the actual catalyst carrier is applied to a monolithic catalyst body with through-flow channels by coating, this catalyst carrier being provided in turn with the active components which are already known. Also known from DE 3 325 292 A1 are oxide carrier catalysts which do not contain any precious metals and are based on iron, nickel and cobalt. As an alternative to these oxide carrier catalysts, technical solutions are described for catalytically active systems of wire wool, woven wire or knitted wire (DE 4 243 500 A1, DE 4 417 984 C1). Principles for the production of such catalysts are listed in DE 4 416 469 C1, DE 19 508 820 C1, DE 19 503 865 C1, DE 19 507 179 C1, and DE 19 539 827 C1.

The combination of catalytic reactors with prior adsorption is described in DE 4 142 176 A1 for cleaning exhaust air from ceramic ovens. For this purpose, the exhaust air is guided successively through an adsorber honeycomb, an electrically operated gas heater, and a honeycomb catalyst. A more complex design is pursued in DE 19 527 490 A1 in that the adsorber is arranged subsequent to the catalyst, the reaction product of the catalyst flows through the adsorber in the course of operation, and the adsorber is subjected to a desorption step at intervals. The pollutants which are liberated in so doing are guided back to the catalyst again through a return channel, while the reaction product of the catalyst is released without secondary treatment. The separation of different pollutants in exhaust gases by means of partial desorption of an adsorber with the aim of selectively eliminating these pollutants is shown in EP 9 101 367. This invention is further directed to the associated principle for returning gas.

Arrangements having the aim of protecting the catalyst against deposits and catalyst toxins are also known from the automotive field. DE 4 326 121 C2 shows a technical solution in which the prior adsorption is carried out with zeolites which are resistant to high temperatures. Further, DE 3 407 172 C2 describes a principle for cleaning the exhaust gases of diesel engines in which filter elements for soot alternate with catalyst elements for post-combustion of gaseous components. For this purpose, the soot filter elements are also outfitted with a catalyst which lowers the firing temperature of the soot and promotes its burnup. U.S. Pat. No. 5,272,874 refers to a combination of catalysts, heat exchangers and filters to achieve a good filter efficiency of the filter downstream thereof by means of cooling the reaction products of the catalyst.

The known technical solutions for oxidative exhaust gas cleaning concentrate on the treatment of relatively high pollutant concentrations to achieve an autothermal operating mode of the catalyst. In general, external heating of the exhaust air for the purpose of achieving and maintaining the working temperature of the catalyst is uneconomical. Where the elimination of unacceptable concentrations of pollutants with respect to work hygiene is concerned, a concentration sufficient for the autothermal catalyst operation is never achieved.

A further disadvantage in the known arrangements and processes consists in that a cleaning efficiency allowing the exhaust air to be reintroduced into the workplace is achieved only by the most elaborate combinations of processes. In such cases, washing liquids or solid filter auxiliary materials are needed, which further increases the quantity of special waste generated.

There is a need, especially in consideration of the use of new materials, for processes for cleaning waste air which have a high cleaning efficiency without burdening the heat-energy balance in the workplace. Further, the amount of special waste is minimized. The process endeavors to make do without substantial preheating of the main air flow.

OBJECT AND SUMMARY OF THE INVENTION

Therefore, it is the primary object of the invention to develop an arrangement and the associated process for removing pollutants from the exhaust air of workplaces and treatment machinery by oxidative means. The properties of the exhaust gas should allow it to be reintroduced into the workplaces.

This object is met in accordance with the invention in that the air flow to be cleaned is guided through two reactors which act, alternatively, as an oxidizer or an adsorber and are formed of heatable reaction zones having two or more layers and formed, respectively, of oxidation catalysts and adsorption mass. The two reactors are operated within the meaning of a regenerative operation by controlling the valves arranged upstream thereof and by controlling the heating according to a timed program or depending on the breakthrough concentration determined by a sensor.

The reactors are advantageously divided into two or more reaction zones whose heaters are controlled separately in such a way that, when the reactor is operating as an oxidizer, the reaction zone lying closest to the outlet is first heated to the catalyst light-off temperature and the further reaction zones are activated in sequence so that the reaction zone at the reactor inlet is the last to reach the catalyst light-off temperature.

DESCRIPTION OF THE PREFERRED EMBODIMENTS

Figure 1:
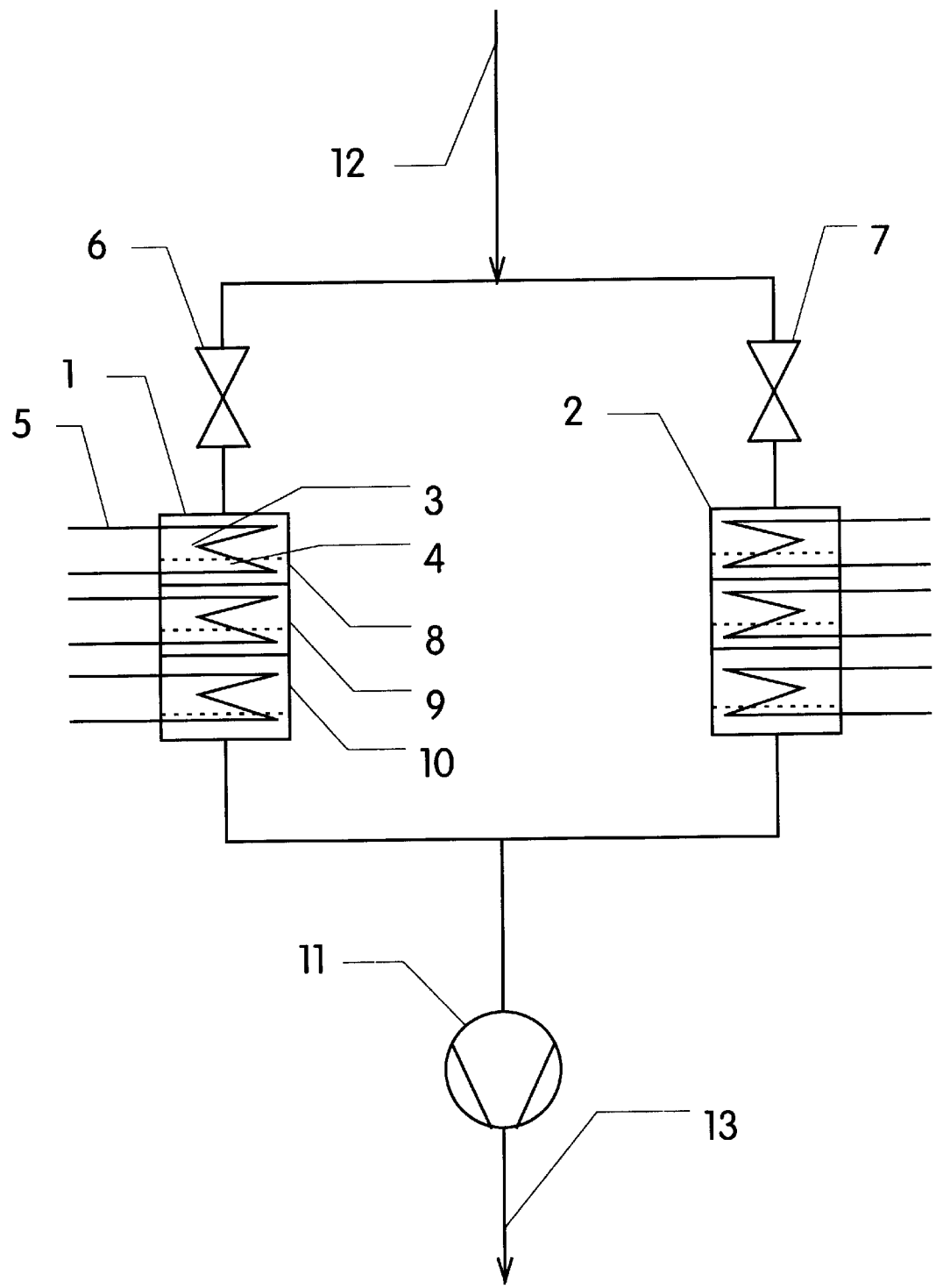
FIG. 1 illustrates the basic construction of the system in schematic form.

The invention plained more fully in the following with reference to the schematic drawing. FIG. 1 shows the basic construction without taking into account the necessary added units for sensing and control.

The arrangement comprises the air guiding means with valves 6 and 7 in the feed to the reactors 1 and 2 whose common output is connected with the suction side of a fan 11. Every reactor is formed of two or more reaction zones 8, 9, 10 (3 reaction zones in the drawing) which are formed in two or more layers (two layers in the drawing) of oxidation catalyst 3 and adsorption mass 4 and a heater 5. The upper layer comprises the catalyst, the lower layer comprises the adsorption mass. For reasons relating to process technology, this layering can be reversed in the reaction zone located directly at the output of the reactor. Likewise, in suitable systems, reaction zones of mixed catalyst and adsorption mass are produced without a separation between the catalyst and adsorption mass, or the catalyst itself takes over the function of the adsorption mass.

The catalyst and adsorption mass are adapted to one another with respect to their temperature response or temperature behavior by a suitable selection of materials: at the catalyst light-off temperature, at least 5% and at most 35% of the pollutant collected on the adsorption mass is desorbed; the maximum working temperature of the catalyst does not exceed the permissible maximum working temperature of the adsorption mass.

It is assumed that reactor 1 is charged with pollutants by a preceding adsorption step, whereas reactor 2 has a free adsorption capacity due to a preceding oxidation.

The feed air or supply air 12 charged with pollutants is predominantly guided through the opened valve 7 to the reactor 2 which has cooled in the meantime. This reactor acts as an adsorber for the pollutant.

A small part of the feed air enters the reactor I through valve 6, which reactor 1 then assumes the state of an oxidizer. The reaction zone 10 located at the output of the reactor is brought to the catalyst light-off temperature by means of its heater. When this temperature is reached, the preceding reaction zones are activated in sequence by their associated heaters. By adapting the catalyst and adsorption mass, a significant quantity of pollutant is first desorbed in the neighborhood of the catalyst light-off temperature and is decreased by oxidation at the respective next catalyst layer. As a result of the developed reaction heat, autothermal operation of the catalyst is ensured until combustion of the entire store of pollutant. The heaters are therefore switched off after the catalyst light-off temperature is reached. After the reduction of all of the pollutants capable of desorption, the temperature of the reactor 1 gradually drops to the ambient temperature.

After a sufficient cooling period, the setting of the valves 6 and 7 is changed by program control. The charged reactor 2 now operates as an oxidizer, whereas reactor 1 acts as an adsorber. All processes are repeated in a corresponding manner.

The invention will be explained in still more detail hereinafter with the aid of the following examples.

1st Embodiment Example

For the purpose of treating the exhaust gases from an installation for laser material processing of PUR-foam composites, an oxidative exhaust gas cleaning according to the invention is configured for an air throughput of 5000 m³/h. The entering exhaust air is distributed to two switchable throttle valves and fed to the reactors. The throttle valves are bored in such a way that approximately 50 m³/h flows through the reactor when the valve is closed. There is a pressure loss of 4650 Pa through the reactor in the adsorber operating mode.

Each reactor comprises 67 l of a commercial wire-knit catalyst with a light-off temperature of 330° C. and 9 l dealuminated Y-zeolite distributed among 3 reaction zones. The mechanical separation of the Y-zeolite is effected by means of a woven wire filter bag. The free cross-sectional area through which the flow of air passes is 0.09 m². The heating is suitable for catalyst light-off temperatures up to a maximum of 490° C. The composition of the exhaust gas is monitored on-line by a semiconductor combustion sensor. The control is effected with a timed program which is superposed by the signal of the semiconductor combustion sensor. A cycle time of 3 h is set. The reaction zones were switched on, beginning with the reaction zone in the vicinity of the reactor output, at a difference in time of 10 min. The following measurement values result:

TABLE 1

Cleaning action of the arrangement in Embodiment Example 1

| substance | concentration at inlet | concentration at outlet |
|---|---|---|
| TOC, total | 3100 μg/m³ | 103 μg/m³ |
| formaldehyde | 550 μg/m³ | 13 μg/m³ |
| aromatics, total | 480 μg/m³ | 22 μg/m³ |

The heating means switched off after approximately 23 to 28 min. The temperature curve of FIG. 2 resulted in the middle reaction zone.

Figure 2:
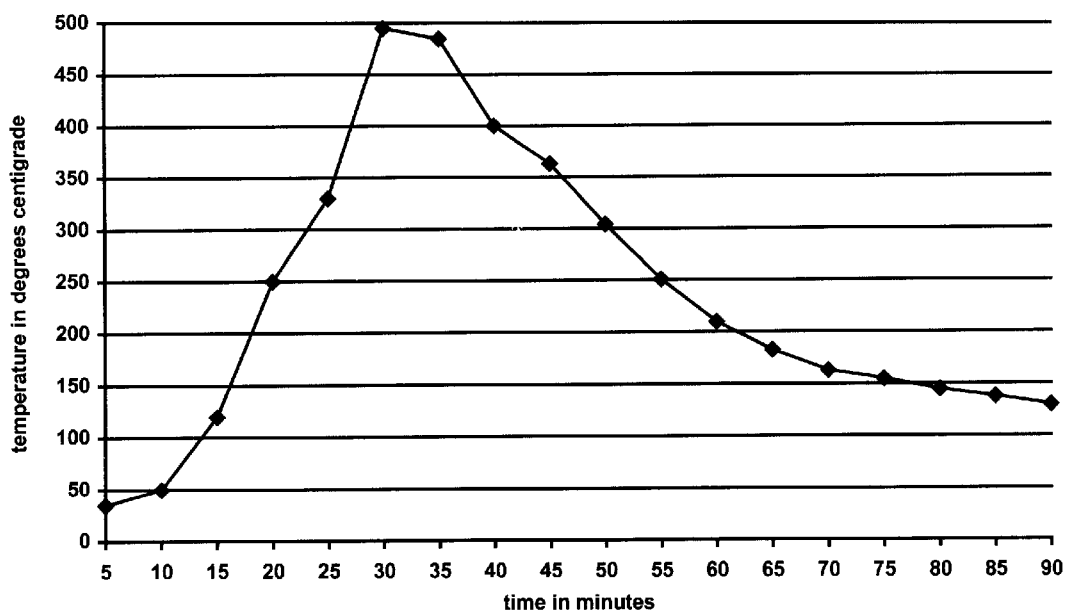
FIG. 2 illustrates a chart showing measured temperature of the reactor versus time.

The temperature-time chart reactor 1, shown in FIG. 2, was recorded after the fourth cycle.

2nd Embodiment Example

An experimental arrangement with a throughput of 1500 m³/h was designed for use for treating oil mists in workshop rooms. An oxidation exhaust gas cleaning means in compact constructional form was realized for treating this air. The entering room air is distributed to the reactors by means of a motor-operated rotary slide in the upper part of the reactor. The rotary slide is so designed that, in both end positions, 20 $m^3$/h of air flow through the reactor operating as an oxidizer. The pressure loss in the reactor in the adsorber operating mode was 4380 Pa.

The reactors are formed, in each instance, of a mixture of 21 l of a commercial wire catalyst and 5 l of HZSM catalyst distributed to 2 reaction zones. The free cross-sectional area through which the flow of air passes is 0.04 $m^2$. The heating is suitable for catalyst light-off temperatures up to a maximum of 450° C. The adjusted time delay between the start of activation of the two reaction zones was 8 min. The exhaust gas composition is continuously monitored visually by a paper control filter. The control is effected with a timed program. The selected cycle time is 6 h. The following measurement values result:

TABLE 2

Cleaning action of the arrangement in Embodiment Example 2

| substance | concentration at inlet | concentration at outlet |
| --- | --- | --- |
| TOC, total | 4300 $\mu g/m^3$ | 88 $\mu g/m^3$ |
| hydrocarbons measured by chemical desorption of activated charcoal, evaluation analogous to DIN 38 409–H18 | 2300 $\mu g/m^3$ | 65 $\mu g/m^3$ |

The observed catalyst light-off temperature was approximately 315° C. The heating means switched off after approximately 32 to 35 min.

While the foregoing description and drawings represent the preferred embodiments of the present invention, it will be obvious to those skilled in the art that various changes and modifications may be made therein without departing from the true spirit and scope of the present invention.

What is claimed is:

1. A process for the oxidative removal of pollutants from an oxygen containing exhaust gas, comprising the steps:

providing a first reactor comprising a plurality of serially arranged reaction zones, wherein each reaction zone contains an upstream catalyst; a downstream absorbent and a heater and providing a second reactor comprising a plurality of serially arranged reaction zones, wherein each reaction zone contains an upstream catalyst; a downstream absorbent and a heater;

periodically alternating the following steps (a) and (b);
(a) increasing the relative flow rate of the exhaust gas flowing into the first reactor so that a major portion of the exhaust gas flows into the first reactor and the pollutants within the exhaust gas are sorbed onto the absorbents, while, simultaneously decreasing the relative flow rate of the exhaust gas flowing into the second reactor so that a minor portion of the exhaust gas flows into the second reactor, and heating said second reactor to a catalyst light-off temperature, so that the pollutants within the exhaust gas and the pollutants released from the absorbents in this second reactor are catalytically destroyed in a downstream catalyst in a downstream reaction zone, and, after a predetermined period of time (b) decreasing the relative flow rate of the exhaust gas flowing into the first reactor so that a minor portion of the exhaust gas flows through the first reactor, and heating said first reactor to a catalyst light-off temperature, so that the pollutants within the exhaust gas and the pollutants released from the absorbents are catalytically destroyed in a downstream catalyst in a downstream reaction zone, while, simultaneously increasing the relative flow rate of the exhaust gas flowing into the second reactor so that a major portion of the exhaust gas flows into the second reactor and the pollutants within the exhaust gas are sorbed by the absorbents.

2. The process of claim 1 for oxidative cleaning of pollutants from exhaust gas wherein each of the first and second reactors contains at least two reaction zones having heaters which are controlled separately so that, when the reactor is operating as an oxidizer, a reaction zone lying closest to the outlet is first heated to the catalyst light-off temperature and additional reaction zones are activated in sequence so that the reaction zone at the reactor inlet is the last to reach the catalyst light-off temperature.

3. The process of claim 1, wherein the catalyst and adsorption mass are comprised of materials selected so that, at the catalyst light-off temperature, at least 5% and at most 35% of the pollutant collected on the adsorption mass is desorbed and the maximum working temperature of the catalyst does not exceed the maximum working temperature of the adsorption mass.

4. The process of claim 1, wherein the catalyst is the adsorption mass.

5. The process of claim 1, wherein the catalyst is mixed with the adsorption mass.

* * * * *